United States Patent
Schoening

(10) Patent No.: US 9,384,565 B2
(45) Date of Patent: Jul. 5, 2016

(54) COLORBLIND ACCESSIBILITY TEST FOR A SCREEN DISPLAY

(71) Applicant: Software AG, Darmstadt (DE)

(72) Inventor: Harald Schoening, Dieburg (DE)

(73) Assignee: Software AG, Darmstadt (DE)

( * ) Notice: Subject to any disclaimer, the term of this patent is extended or adjusted under 35 U.S.C. 154(b) by 195 days.

(21) Appl. No.: 14/073,781

(22) Filed: Nov. 6, 2013

(65) Prior Publication Data

US 2015/0123982 A1    May 7, 2015

(51) Int. Cl.
  *G06T 11/00*  (2006.01)
(52) U.S. Cl.
  CPC ........... *G06T 11/001* (2013.01); *G06T 2200/24* (2013.01)
(58) Field of Classification Search
  CPC ....................................................... G06T 11/00
  See application file for complete search history.

(56) References Cited

U.S. PATENT DOCUMENTS

| | | | |
|---|---|---|---|
| 5,467,123 A | 11/1995 | Zeevi et al. | |
| 7,124,375 B1 | 10/2006 | Steele et al. | |
| 7,344,250 B2 | 3/2008 | Sato | |
| 7,983,920 B2 | 7/2011 | Sinclair, II | |
| 8,169,447 B2 | 5/2012 | Bhogal et al. | |
| 8,412,694 B2 | 4/2013 | Wang et al. | |
| 2007/0074167 A1* | 3/2007 | Cohrs | G06F 11/3672 717/124 |
| 2009/0263016 A1* | 10/2009 | Kuo | G06T 7/0002 382/167 |
| 2011/0304641 A1* | 12/2011 | Grieves | G06K 9/036 345/590 |
| 2012/0121172 A1* | 5/2012 | Wang | G06K 9/036 382/165 |
| 2014/0351796 A1* | 11/2014 | Gur-esh | G06F 11/3624 717/126 |

OTHER PUBLICATIONS

AccessColor—Online Tool for Colour Contrast, Feb. 4, 2013, 2 pages. https://web.archive.org/web/20130204074748/http:/www.accesskeys.org/tools/color-contrast.html.
About EXSYST, retrieved Sep. 24, 2015, 1 page. https://web.archive.org/web/20121208044119/http:/www.exsyst.org/.
GUITAR Home page, Oct. 16, 2012, 6 pages. https://web.archive.org/web/20121016192735/http:/sourceforge.net/apps/mediawiki/guitar/index.php?title=GUITAR_Home_Page.
GSA Image Analyser, Oct. 22, 2012, 3 pages. https://web.archive.org/web/20121022134526/http:/image.analyser.gsa-online.de/?lang=en.
WAVE, Feb. 1, 2013, 2 pages. https://web.archive.org/web/20130201100704/http:/wave.webaim.org/.
Colorblind_Web_Page_Filter, Feb. 4, 2012, 2 pages. https://web.archive.org/web/20120204095616/http:/colorfilter.wickline.org/.

(Continued)

*Primary Examiner* — Ryan D McCulley
(74) *Attorney, Agent, or Firm* — Nixon & Vanderhye PC

(57) ABSTRACT

A method and apparatus for testing a screen display for colorblind accessibility identifies when an onscreen display is likely to be accessible or inaccessible to a colorblind individual. The method and apparatus can receive data corresponding to a screen display, including information encoded in color. The method and apparatus can further apply a color filter to the screen display to remove a background color generating a filtered image. The method and apparatus can further detect an object associated with the filtered image. The method and apparatus can further detect whether there is text in the filtered image and determine a proximity of the detected text to the object when text is detected and generate a colorblindness accessibility indicator based on whether text was detected and/or the determined proximity.

18 Claims, 13 Drawing Sheets
(9 of 13 Drawing Sheet(s) Filed in Color)

(56) References Cited

OTHER PUBLICATIONS

Coblis—Color Blindness Simulator, Apr. 27, 2013, 12 pages. https://web.archive.org/web/20130427000034/http://www.color-blindness.com/coblis-color-blindness-simulator.

Accessibility Color Wheel, Jan. 21, 2013, 2 pages. https://web.archive.org/web/20130121012348/http:/gmazzocato.altervista.org/colorwheel/wheel.php.

PAX-it! Image Analysis Software, Jan. 26, 2013, 2 pages. https://web.archive.org/web/20130126151817/http://www.paxit.com/paxit/enhanced.asp.

Juicy Studio Colour Contrast Analyser, Sep. 5, 2008, 2 pages. https://web.archive.org/web/20080905223524/http://www.juicystudio.com/services/colourcontrast.asp.

* cited by examiner

COLORBLIND ACCESSIBILITY TEST FOR A SCREEN DISPLAY

CROSS-REFERENCE TO RELATED APPLICATIONS

This application is related to U.S. application Ser. No. 14/073,785, entitled "Colorblind Accessibility Test for Corresponding Screen Displays," by Dr. Harald Schöning, filed on Nov. 6, 2013, which is incorporated by reference herein in its entirety.

BACKGROUND

Colorblindness, or the inability or decreased ability to see color, affects a significant percentage of the population. However, among people afflicted with colorblindness, people can be affected to varying degrees and there is no uniform set of colors that can be distinguished by every colorblind individual. As a result, using only color graphics (e.g., color coded pie charts or bar graphs) to convey information in computer applications, such as an operating system, web page, or graphic display, can make this information inaccessible to certain colorblind individuals. Developers of screen displays who might have perfect color sight, however, are often unaware that they have included color coded information that is inaccessible to colorblind individuals. The prevalence of this problem is significant enough that the federal government has defined regulations requiring that certain computer systems must be accessible to colorblind people (e.g., Section 508 of the Rehabilitation Act Amendments of 1998).

SUMMARY

The disclosed subject matter can include a method for testing a screen display for colorblind accessibility. The method can include receiving, at a processor, data corresponding to a screen display including information encoded in color. The method can further include, applying, using the processor, a color filter to the screen display to remove a background color generating a filtered image. The method can further include detecting an object in the filtered image using the processor. The method can further include detecting whether there is text in the filtered image using the processor. The method can further include determining a proximity of the detected text to the object when text is detected and generating a colorblindness accessibility indicator using the processor based on whether text was detected and/or the determined proximity.

Embodiments of the disclosed subject matter can provide one or more of the following capabilities. Embodiments of the disclosed subject matter can identify when an onscreen display is likely to be accessible or inaccessible to a colorblind individual. Embodiments of the disclosed subject matter can provide an alert when an onscreen display is likely to be inaccessible to a colorblind individual. Embodiments of the disclosed subject matter can automatically add text to the color coded information to make the information more accessible to a colorblind individual. Embodiments of the disclosed subject matter can provide an editing unit to allow a user to manually input text within or adjacent to the color coded information to make the information accessible to a colorblind individual. Embodiments of the disclosed subject matter can generate and display a positive indicator if the onscreen display is likely to be accessible to colorblind people or a negative indicator if the onscreen display is like to be inaccessible to colorblind people. Embodiments of the disclosed subject matter can send an e-mail alert to an administrator when an onscreen display is likely to be inaccessible to colorblind people.

These and other capabilities of the disclosed subject matter will be more fully understood after a review of the following figures, detailed description, and claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Embodiments of the subject matter disclosed herein can provide techniques for determining whether a user interface screen is likely to be accessible to a colorblind individual. For example, some user interfaces that convey information using colors may be inaccessible to people that have trouble seeing those colors if there is no accompanying text. Thus, a computer system can test a screen for information that is conveyed only by color. In some embodiments, a computer system can accomplish this by detecting graphics displayed therein. The graphics can then be tested to determine whether they convey color coded information and whether this color coded information is likely to be accessible to individuals who are colorblind. The computer can be configured to generate a positive indicator if the screen display is likely to be accessible to colorblind people or a negative indicator if the screen display is likely to be inaccessible to colorblind people. The indicator can be provided to user interface developers as feedback indicating whether the user interface is likely to be accessible to colorblind people. Other embodiments are within the scope of the disclosed subject matter.

Figure 1:
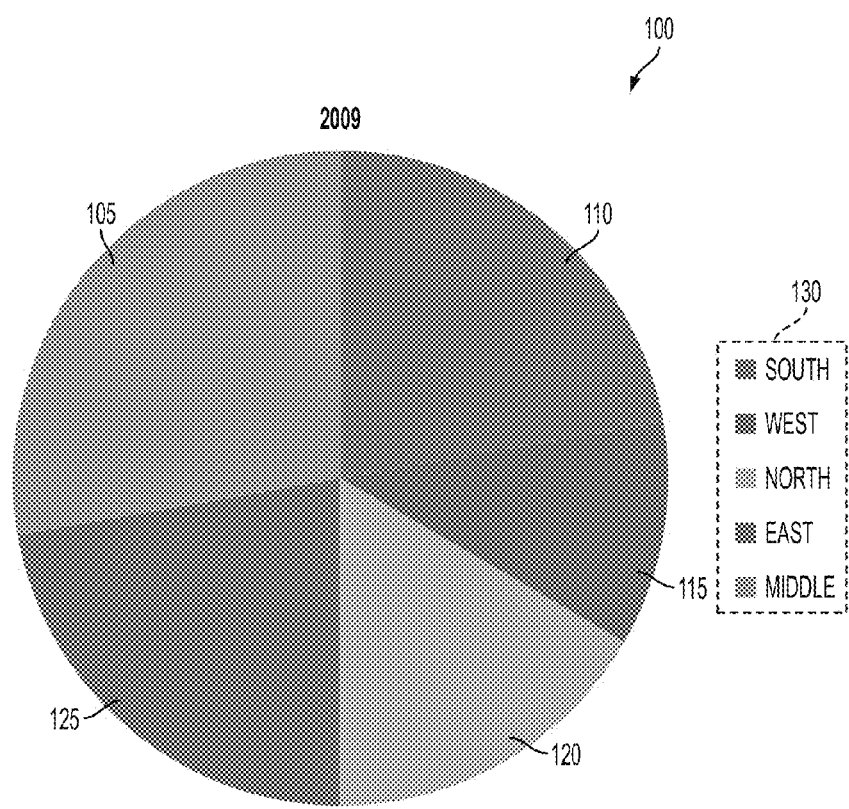
FIG. 1 is an exemplary screen display including color to convey information to a user.
Figure 2:
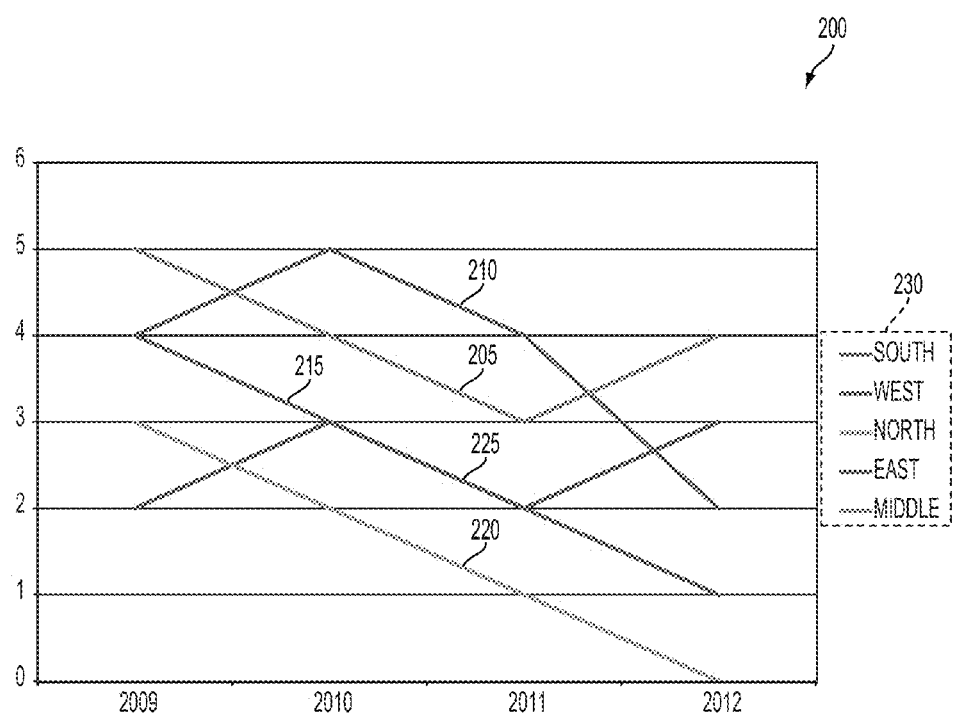
FIG. 2 is an exemplary screen display including color to convey information to a user.

FIGS. 1 and 2 illustrate examples of displays that convey information using color in a manner that is likely to be inaccessible to someone that is colorblind.

FIG. 1 includes a pie chart 100 having five sectors (e.g., 105, 110, 115, 120, and 125) where each sector is a different color and represents a different geographical location. Sector 105 is light blue, sector 110 is dark blue, sector 115 is red, sector 120 is green, and sector 125 is purple. To the right of the pie chart is a color key 130 that defines which color corresponds to which data category (e.g., geographical location in FIG. 1). A person who is colorblind might have difficulty distinguishing the colored sectors of the pie chart and might not be able to comprehend the information that is being conveyed by the pie chart. Thus, a screen display containing a colored pie chart, as illustrated in FIG. 1, might be inaccessible to colorblind individuals and should typically fail a colorblindness accessibility test.

Likewise, FIG. 2, also includes information that is conveyed using color. Specifically, FIG. 2 shows a line graph 200, where each line is a different color and represents a different geographical location. In the figure line 205 is light blue, line 210 is purple, line 215 is dark blue, line 220 is green and line 225 is red. A color key 230 to the right defines which color corresponds to which data category (e.g., geographical location). Similar to that described above, FIG. 2 shows a display that a colorblind individual might have difficulty reading and should typically fail a colorblindness accessibility test.

Figure 3:
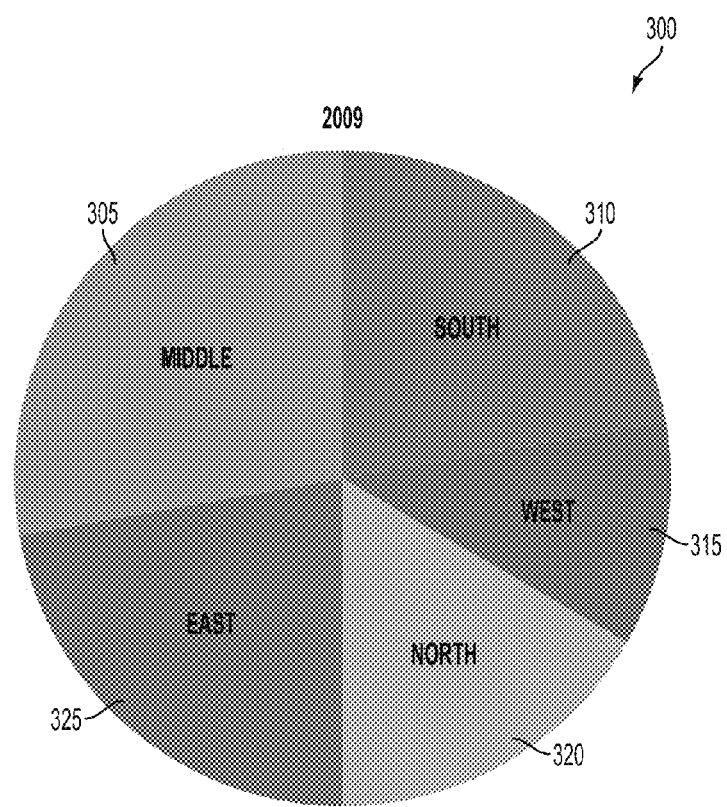
FIG. 3 is an exemplary screen display including color and text to convey information to a user.
Figure 4:
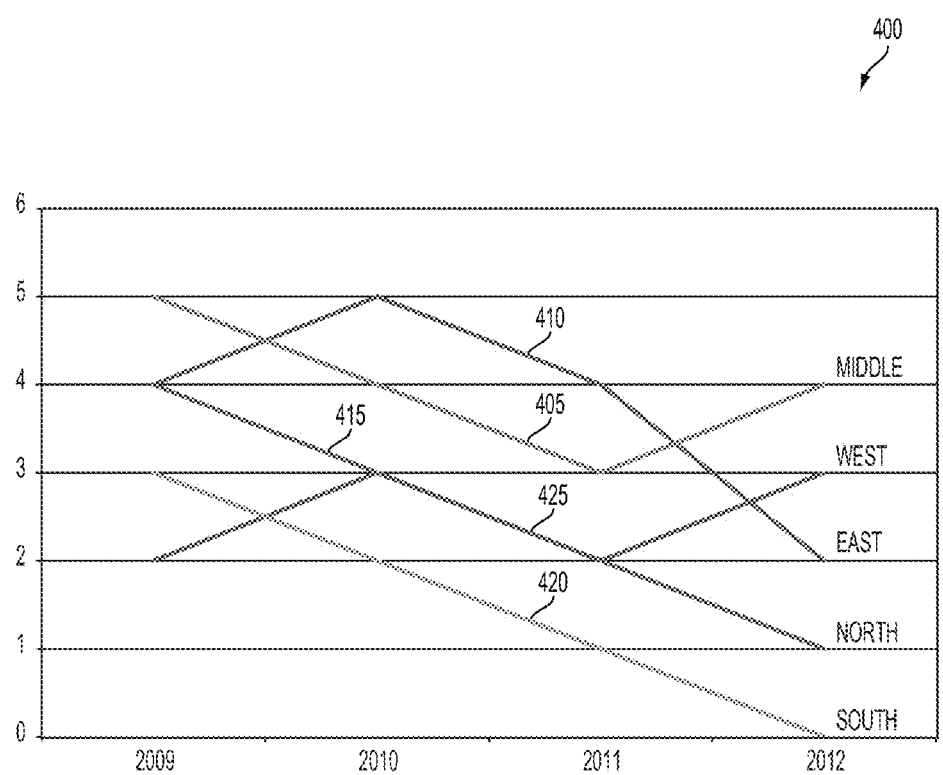
FIG. 4 is an exemplary screen display including color and text to convey information to a user.

In contrast to FIGS. 1 and 2, the pie chart shown in FIG. 3 and the line graph shown in FIG. 4 convey the same information and use the same graphics as depicted in FIGS. 1 and 2. However, the graphics in FIGS. 3 and 4 also include text that is associated with the colored sectors of the pie chart and the colored lines of the line graph and describe what the different colors represent. For example, in pie chart 300, sector 305 is light blue and labeled "Middle," sector 310 is dark blue and labeled "South," sector 315 is red and labeled "West," sector 320 is green and labeled "North," and sector 325 is purple and labeled "East." Likewise, in line graph 400, line 405 is light blue and labeled "Middle," line 410 is purple and labeled "East," line 415 is dark blue and labeled "North," line 420 is green and labeled "South," and line 425 is red and labeled "West." Thus, the location and placement of the text in FIGS. 3 and 4 are likely to make these displays more accessible to a colorblind individual. Accordingly, screen displays including a pie chart as shown in FIG. 3 or a line graph as shown in FIG. 4 should typically pass a colorblindness accessibility test.

Figure 5:
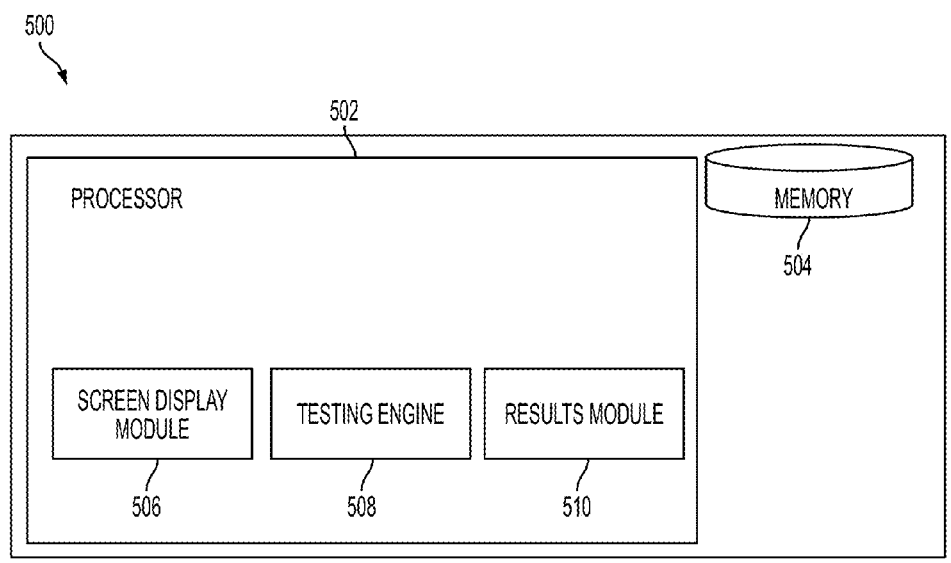
FIG. 5 is a schematic diagram of a computer system for testing graphics conveying information using color.

FIG. 5 is a block diagram of an exemplary computing system 500 that can be used to test user interface screens, or other screen displays, for information that is conveyed only in color to determine whether the interface screen is likely to be accessible to a colorblind person. Computing system 500 preferably includes a processor 502, a memory 504, a screen display module 506, a testing engine 508 for testing colorblind accessibility, and a results module 510 for displaying the outcome of the colorblind accessibility test. While each of the foregoing components are shown as specific blocks in FIG. 5, this is exemplary only. Although the screen display module 506, testing engine 508 and results module 510 are shown in FIG. 5 as part of processor 502, this is not required. The functionality described herein can be combined into a single component or spread across several components.

The computing system 500 can be configured to analyze screen displays that may contain graphics. Examples of screen displays that may contain graphics include user interfaces, operating systems, webpages, PowerPoint® presentations, and Excel® spreadsheets, although the system 500 can be used with virtually any device capable of displaying information (e.g., televisions, computer screens, game console displays, smartphone screens, tablet screens, airport check-in kiosks). In some embodiments, the techniques described herein can be used with physical printouts (e.g., by digitizing them using a scanner and/or camera). For example, pages of a book can be digitized using a scanner so that they can be analyzed by the techniques described herein. The computing system 500 can be a standalone system that is implemented on dedicated hardware, can be software as a service, and/or can be a stand-alone application (e.g., an application for an iPad®).

The processor 502 can be a general-purpose device, such as a microcontroller and/or a microprocessor, such the Pentium IV series of microprocessor manufactured by the Intel Corporation of Santa Clara, Calif., specially programmed to provide the functionality described herein. In certain embodiments, the processor can be a dedicated purpose device, such as an Application Specific Integrated Circuit (ASIC) or a Field Programmable Gate Array (FPGA) that has been designed to implement in its hardware and/or firmware at least a part of an embodiment disclosed herein.

The memory 504 can be can be an apparatus capable of storing analog or digital information, such as instructions and/or data. Examples include a nonvolatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory 504 can be coupled to a processor and/or can store instructions adapted to be executed by the processor, such as according to an embodiment disclosed herein.

The screen display module 506 can be configured to provide screen displays containing graphics with color coded information to a display (not shown) such that the screen displays are shown to a user. The display module 506 can also be configured to provide the screen displays to the testing engine 508, either directly and/or via a network. A network can be and/or can utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

The testing engine 508 can be configured to receive data corresponding to the screen displays from the screen display module 506 and test them to determine how accessible they are likely to be to a colorblind individual (as described more fully below). For example, the testing engine 508 can be configured to check for typical display schemes that include color coded information (e.g., a pie chart, a bar graph, and a line graph). While an exemplary embodiment of the testing engine 508 receives screen displays from the screen display module 506, other configurations are possible. For example, the testing engine 508 can be configured as part of the screen display module 506 itself.

The testing engine 508 can also be configured to detect whether there is text associated with the color coded information included in the received screen displays. The testing engine 508 can also be configured to evaluate the text and to determine whether the text describes what the color coded information represents. The testing engine 508 can further be configured to generate a positive indicator if the color coded information found in the received screen display includes text that describes what the color coded information represents (e.g., is likely to be accessible to a colorblind individual). The testing engine 508 can be configured to generate a negative indicator if the color coded information found in the received screen display does not include text or does not include text that describes what the color coded information represents (e.g., is not likely to be accessible to a colorblind individual).

The testing engine 508 can also be configured to communicate the positive or negative indicator to a results module 510, via, for example, a network connection (e.g., the Internet, intranet, and/or a local area network) or an internal bus. The results server can be configured to display the positive or negative indicator in a variety of formats, for example, on the display itself, in a Microsoft Word® document, or in an Excel® spreadsheet. The results module 510 can also be configured to generate an external alert when a particular display is given a negative indicator (e.g., the results module 510 can be configured to send an e-mail alert to an administrator). While the results module 510 of computing system 500 can be configured to display the outcome of the colorblind accessibility test for a screen display, other configurations are possible. For example, the screen display module 506 or the testing engine 508 can also display the outcome of the colorblind accessibility test for a screen display. The testing engine 508 can be further configured to generate a negative or positive indicator based on whether the color coded information found in the screen display is in compliance with federal government regulations defining accessibility of screen displays to colorblind people (e.g., Section 508 of the Rehabilitation Act Amendments of 1998).

Figure 6A:
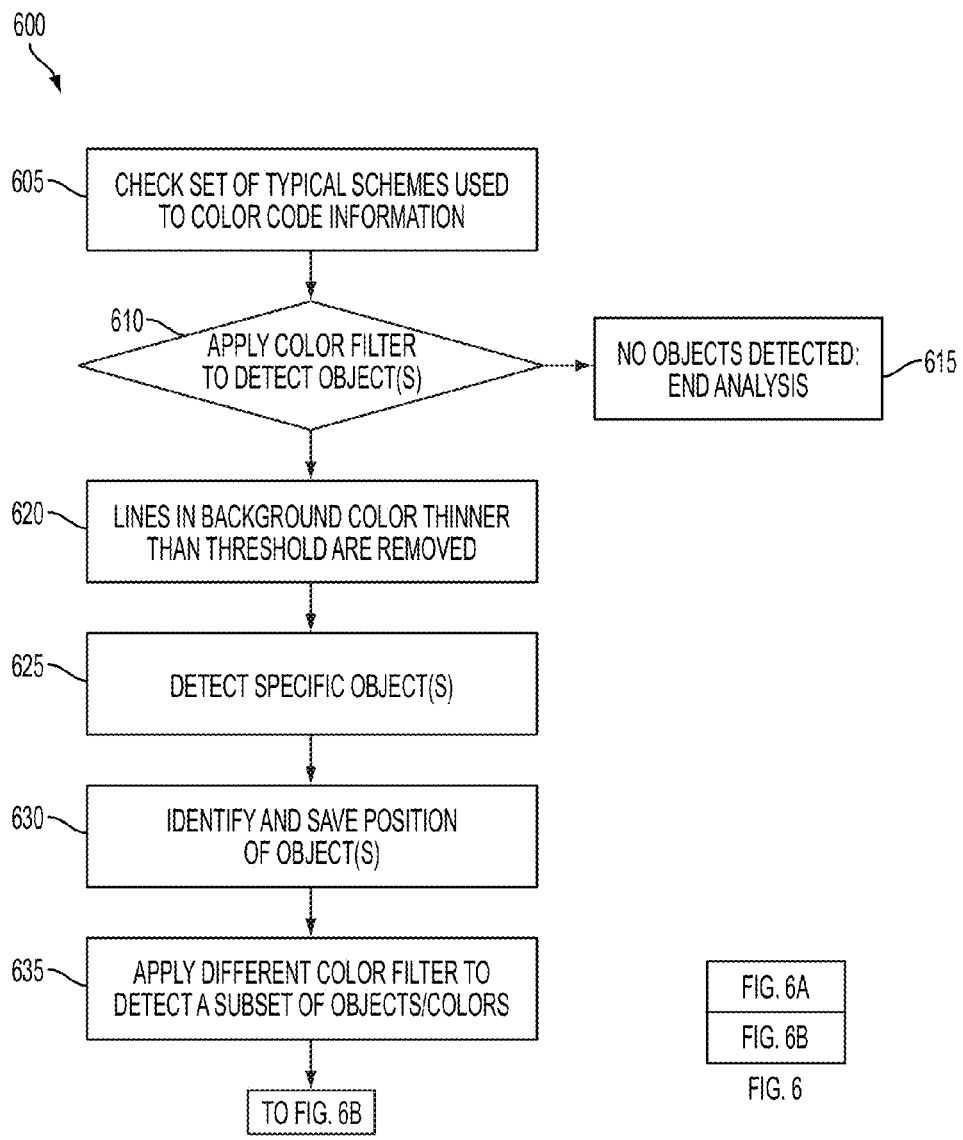
FIGS. 6a and 6b are a process flow diagram of an exemplary method for use with the computer system of FIG. 5.
Figure 6B:
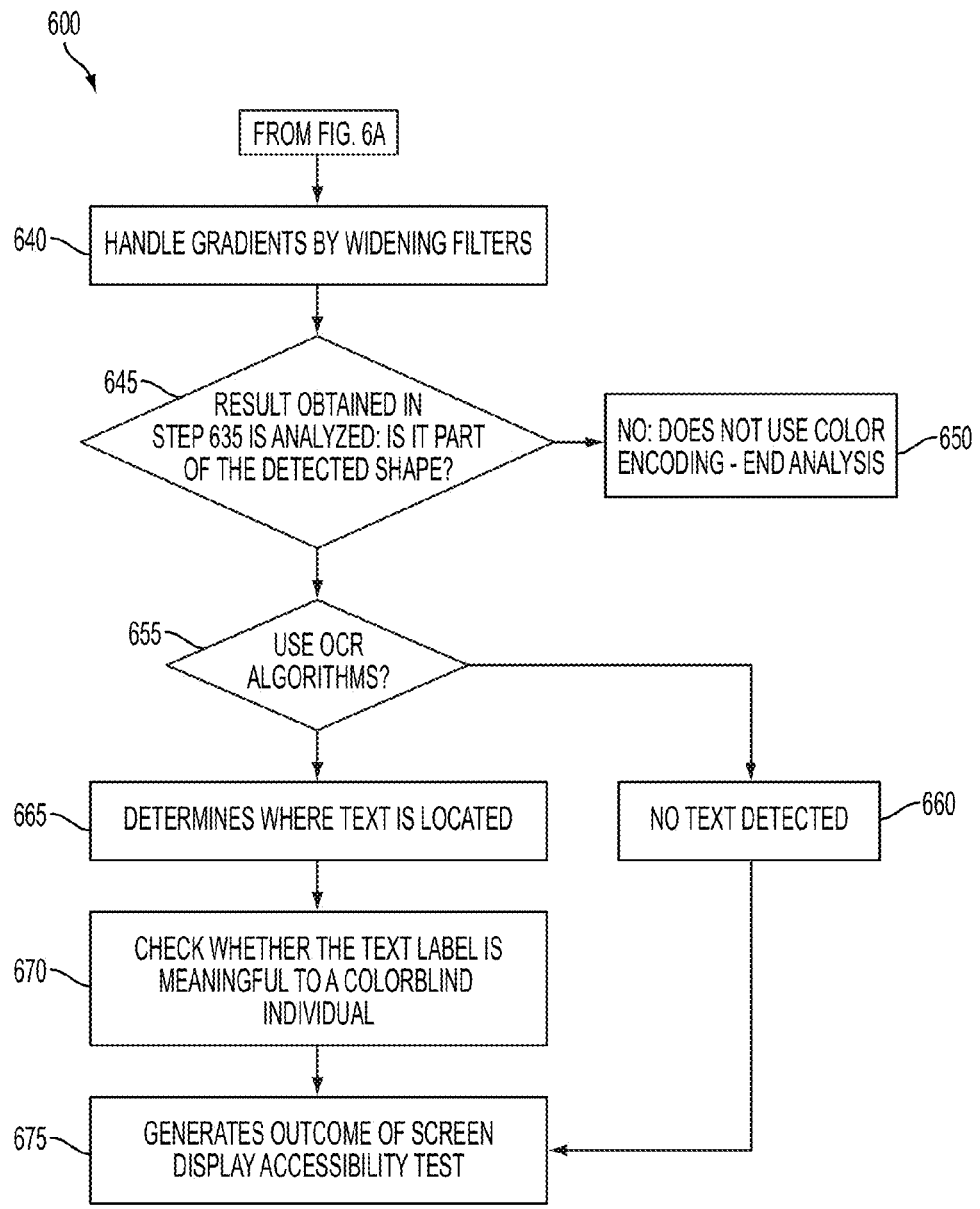

In operation, referring to FIGS. 6a and 6b, with further reference to FIG. 5, an exemplary process 600 is shown for testing screen displays for color coded information and accessibility to colorblind people. An exemplary embodiment of process 600 uses the computing system 500 (although this is not required), and includes the steps set forth below. The process 600, however, is exemplary only and not limiting. The process 600 can be altered (e.g., by having steps added, removed, altered, or rearranged). While the process 600 is primarily described as analyzing a pie chart, this is not required, and other types of display schemes can be analyzed.

At step 605, the testing engine 508 can analyze a screen display to determine whether it includes a display scheme that is likely to provide information using only color. For example, the testing engine 508 can be configured (as discussed further below) to determine whether a display screen includes a pie chart (e.g., where each segment of the pie chart is distinguished by a different color and represents a category of information), a line chart (e.g., where each line is distinguished by a different color and represents a category of information), and a bar chart (e.g., where each bar is distinguished by a different color and represents a category of information). Other schemes are possible, including schemes that include, or are similar to, the set of colored charts provided in Excel® (e.g., column chart, area chart, scatter chart, stock chart, surface chart, doughnut chart, bubble chart, radar chart). For example, schemes can also include objects of the same shape but different colors (e.g., traffic lights, bubbles, squares.) Each scheme can have a different pattern used by the testing engine 508 to detect whether a graphic includes color coded information that is not accessible to colorblind people. In some embodiments, a user can specify which schemes the testing engine 508 should check for on a single screen display or a sequence of screen displays (e.g., only pie charts but not bar graphs). While process 600 includes step 605, step 605 is not required. For example, a process 600 can be applied without checking whether a screen display includes a particular display scheme and can begin with step 610. That is, the process can be carried out using scheme-agnostic analysis.

In some embodiments, once the testing engine 508 determines that a particular scheme is being used on a display screen, the process 600 can use instructions in later steps that are tailored to work with that specific display scheme. For example, if during step 605 the testing engine 508 determines that a pie chart is present, the subsequent steps of process 600 can use algorithms that are optimized to work with pie charts. Likewise, if during step 605 the testing engine 508 determines that a line graph is present, the subsequent steps of process 600 can use algorithms that are optimized to work with line graphs.

Figure 7:
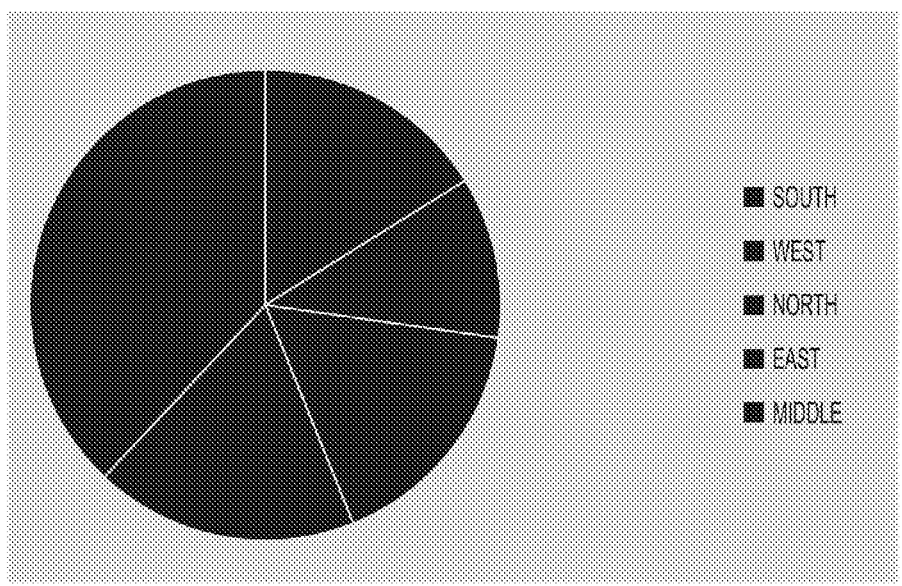
FIG. 7 is an exemplary result after applying a full color filter to a screen display containing a colored pie chart.

At step 610, the testing engine 508 can be configured to apply a color analysis algorithm to detect graphical objects in a display screen. For example, this can be accomplished using a full color filter that excludes the background color and shows all foreground objects in a same color (e.g., black), thus creating a two-tone figure. FIG. 7 shows an exemplary result after applying a full color filter to a screen display including a color coded pie chart. Examples of existing color analysis programs that can be used include image analysis software by PAX-it!, and/or Image-Analyser by GSA, although other color analysis programs can be used. If no objects are detected, the process 600 can proceed to step 615, otherwise the process can continue to step 620.

At step 615, if no objects are detected the process 600 can end.

In some embodiments, an object can be the entire screen itself. For example, a screen display that is entirely one color can convey well-known meanings associated with that color. For example, an entirely red screen can convey "stop" or a screen that is entirely green can convey "go." If the testing engine 508 determines that color is being used to provide information, then process 600 can proceed to step 655.

At step 620, the testing engine 508 can remove background color lines that are thinner than a predetermined threshold by converting them to a foreground color. For example, if a pie chart includes borderlines between pie segments in the same color as the background color (e.g., as shown in FIG. 7) and the borderlines are thinner than a predefined threshold, then the testing engine 508 can remove the borderlines by converting them to the foreground color.

At step 625, the testing engine 508 can detect specific objects within the screen display. For example, the testing algorithm can detect objects such as circles, triangles, squares, spheres, columns, rectangles, wedges, lines, bubbles, webs, dots, map routes, data tables, several objects of the same shape grouped together. Examples of existing object detection programs that can be used include image analysis software by PAX-it!, and/or Image-Analyser by GSA, although other object detection programs can be used. Various methods can be used to detect objects, including, for example, by shape, size and/or other criteria. Filters can be applied to disregard objects of certain shapes, and/or to split the results into size categories. When an object detection algorithm is applied to the pie chart of the exemplary embodiment, a circle can be detected.

At step 630, the location of a detected object, as well as certain coordinates within the object, may be identified and saved for further reference. For example, if a pie chart is detected, then the location and the center of the circle may be identified and can be saved for further reference. This step can be repeated for each object detected in a screen display (e.g., several objects can be detected in a single screen display).

At step 635, the testing engine 508 can apply another color filter to the original screen display (e.g., the screen displays 100 and 300 shown in FIGS. 1 and 3), selecting only a subset, rather than a full set, of the colors in the detected object (e.g., the pie chart shown in FIGS. 1 and 3). For example, applying a filter that only detects light blue to a pie chart including a light blue colored wedge can produce the result shown in FIG. 8 (where the portions in black in FIG. 8 were originally light blue, and where the portions in yellow in FIG. 8 were a color other than light blue). The number of different color subsets to filter for can be predefined and/or automatically extracted by analyzing the image (e.g., analyzing the image to determine how many colors, other than the background color, are present).

At step 640, the process 600 can detect color gradients that are present in a screen display. For example, color gradients can include gradual color blends between two or more colors and/or between two tints of the same color. The testing engine 508 can be configured to detect color gradients by configuring the testing engine 508 to broaden the color filter to include the full spectrum of the color gradient. For example, instead of applying a filter that extracts light blue and dark blue colors separately, the colored filter can be broadened to extract the full blue gradient (including light blue and dark blue colors) at the same time. Likewise, for a gradient that transitions from orange to green the filter can be configured to extract all combinations of orange and green. The output of such a gradient filter can be similar to that shown in FIG. 8. While step 640 is listed as a separate step, this is not required. For example, step 640 can be included in step 635 described above, and a color filter applied to a screen display can be set to include color gradients.

Figure 8:
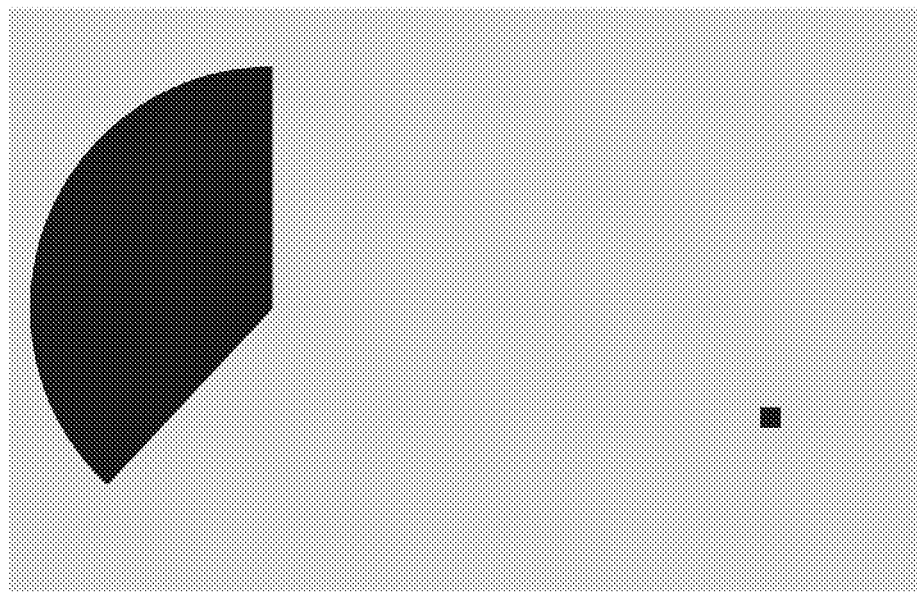
FIG. 8 is an exemplary result after applying a subset color filter to a screen display containing a colored pie chart.

At step 645, a further test can be applied to the result in FIG. 8. This test can be used to detect a second object (e.g., an object different from the pie chart detected in step 625), determine the shape of the second object (e.g., a wedge), and/or the location of the second object in relation to the location previously identified as containing the pie chart. As an example, if there a second object detected within the location previously identified as containing the circle of the pie chart, then the second object can be checked to determine whether it contains borderlines that resemble a portion of a pie chart. For example, the second object can be checked for two border lines that converge at the center of the previously detected circle and/or whether a third borderline coincides with a segment of the original circle's borderline (e.g., the perimeter of the original circle.) In some embodiments, a second object can include, for example, a bar, circle, dot, spoke, square, column, sphere, rectangle, bubble, crescent, triangle, stock indicator and a line. If the second object is not within the location of the previously identified object (e.g., the object detected in step 625), the process 600 can proceed to step 650 where the process can end. Otherwise the process 600 can continue to step 655. In some embodiments, where multiple objects are detected in step 625, step 645 can be repeated for each object detected in step 625.

At step 655, an algorithm can be used to check whether there are additional elements (e.g., text) that are associated with the colored areas of the detected object (e.g., a pie chart). In some embodiments, optical character recognition (OCR) algorithms can be applied to the entire pie chart or a subset of the pie chart. Examples of existing OCR programs that can be used include OCRopus released under the Apache License, GNU Optical Character Recognition (GOCR), CuneiForm developed at Cognitive Technologies, GNU Ocrad, Tesseract OCR and OCRFeeder, although other OCR programs can be used. Algorithms similar to OCR can also be used to detect other shapes and/or symbols. The OCR algorithm can be helpful in determining whether a pie chart conveys non-color-coded information to help a colorblind individual understand the color coded information being conveyed by the chart. For example, an OCR algorithm applied to FIG. 9 can detect the text "Middle" within a segment of the pie chart. In another embodiment, an OCR algorithm applied to FIG. 10 can detect the text "Middle," "South," "West," "North," and "East" near the different segments of the pie chart. If text (or symbols) are detected, the process 600 proceeds to step 665, otherwise it proceeds to step 660.

In some embodiments, in addition to, or in place of, performing an OCR analysis at step 655, the screen display can be analyzed for graphics that include color coded information that can be accessible to color blind people even without including text. For example, graphics that include color coded information that appears as a vertical traffic light and displays a green light at the bottom of the traffic light can be accessible to colorblind people based on the position of the light (e.g., colorblind people expect that the color green will appear at the bottom of a vertical traffic light even if they cannot discern the actual color). Accordingly, the testing engine 508 can compare the graphics in a screen display including color coded information to a set of figures familiar to colorblind people (e.g., a vertical traffic light, an octagonal stop sign). If the testing engine 508 determines that the graphics are accessible to colorblind people even without including any text, then the testing engine 508 can further determine that the screen display passed the color accessibility test and provide a positive indicator.

Figure 9:
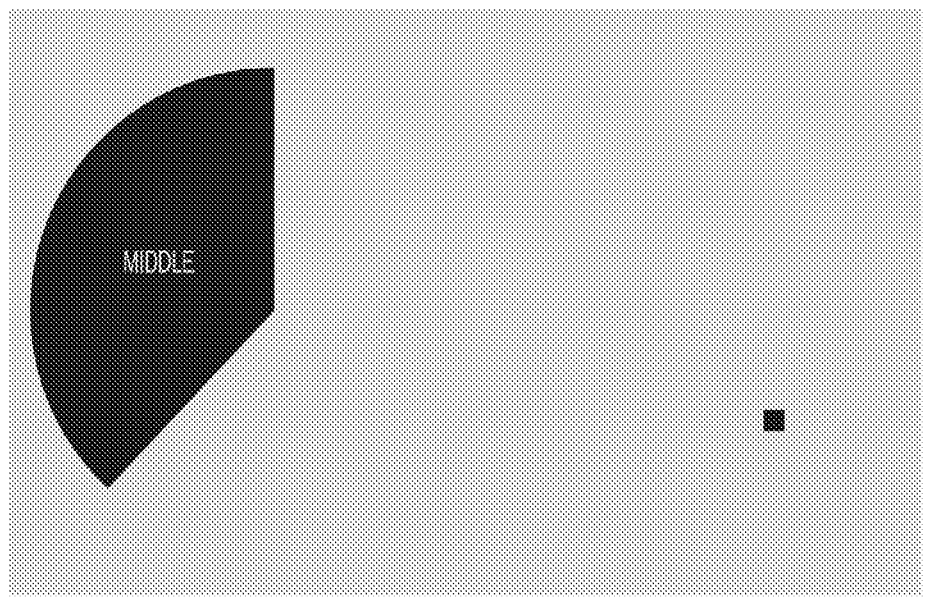
FIG. 9 is an exemplary segment of a pie chart including text information.
Figure 10:
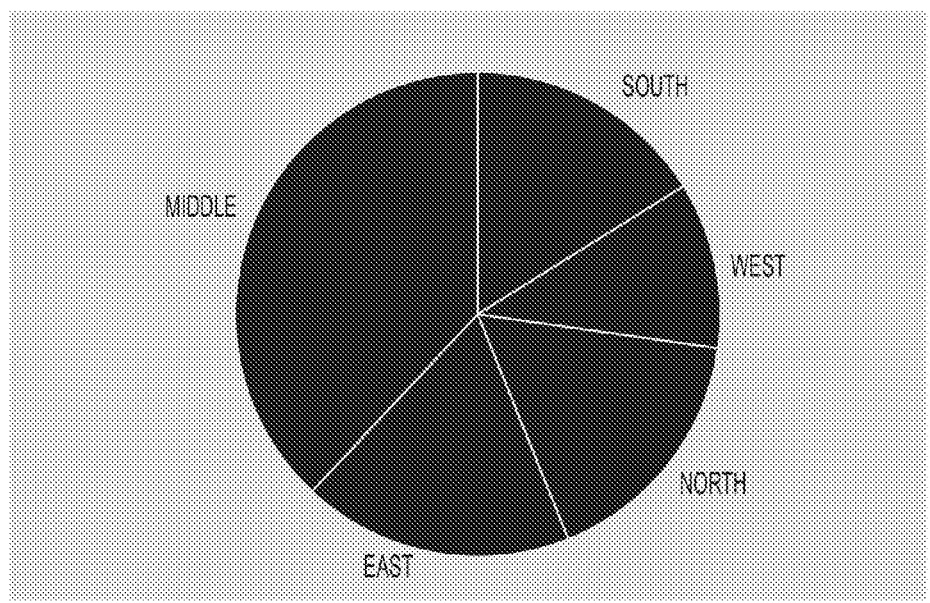
FIG. 10 is an exemplary pie chart including text information.

At step 665, the testing engine 508 can determine where the text is located in the screen display. For example, the testing engine 508 can determine whether the text is outside or inside of the pie chart. If the text appears inside the colored area of the pie chart, then the OCR algorithm can preferably detect it on the filtered image of the entire pie chart or a subset of the pie chart, an example of which is shown in FIG. 9. If the text appears outside the pie chart, the text can preferably be detected on the full filtered image (e.g., as shown in FIG. 10).

At step 665, the testing engine 508 can also determine how close the detected text is to a color-coded portion of the screen display using an adjacency metric. By measuring this, the testing engine can make a hypothesis whether the text actually describes the color-coded portion of the screen display. For example, if the distance between text and a color-coded portion of the screen display is over a predetermined threshold, the testing engine 508 can determine that the text is unrelated to the color-coded portion of the screen display. For example, referring to FIG. 10, because "Middle" is immediately adjacent to the upper left sector, it is likely relevant to that sector. Whereas, if "Middle" was further away, it likely would not relate to the upper left sector. Using the algorithm, the testing engine 508 can also match text to particular sectors. For example, the testing engine 508 can make the assumption that the sector closest to the text corresponds to the text. If detected text is too far from a corresponding color-coded portion of the screen display to be useful (e.g., if the distance is over a predetermined threshold), the process 600 can proceed straight to step 675 and indicate that the screen display failed the color accessibility test.

Figure 11:
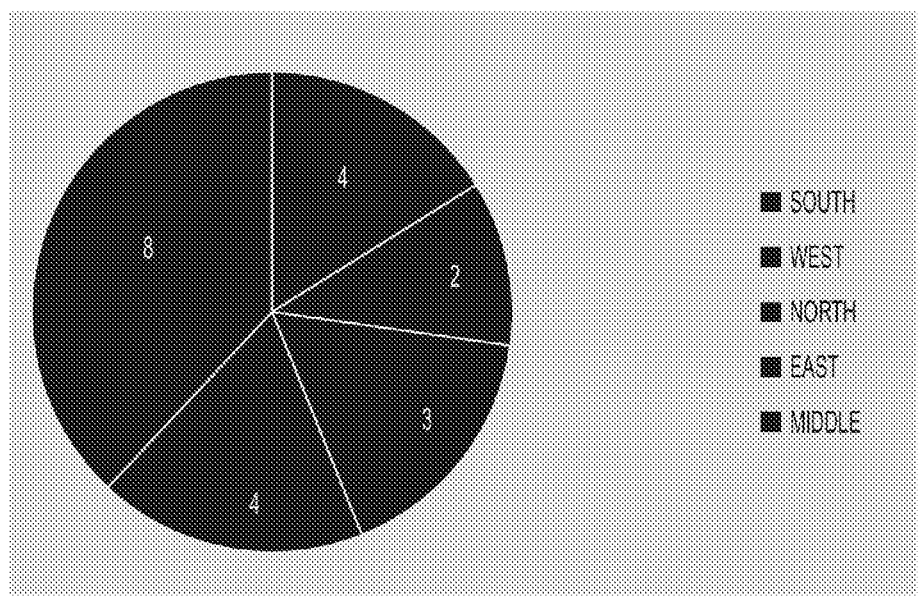
FIG. 11 is an exemplary pie chart including numerical information.

Referring now to step 670, using only OCR algorithms to test whether an image conveys useful information to a colorblind individual can be misleading in, for example, the case where a pie chart is labeled with values other than the information that the different colors represent. For example, if the text associated with the colors showed a number, as illustrated in FIG. 11, rather than the category name of what the color represents (e.g., geographical location), then the pie chart, even though text was detected, would still not convey meaningful information to a colorblind individual. To prevent inaccurate accessibility results, the testing engine 508 at step 670 can be configured to apply an algorithm to exclude textual information that does not convey meaningful information to a colorblind individual (e.g., text that only consists of number, percentage signs, dates, or identical text associated with different colors). If the detected text information is not useful to a colorblind person to interpret the screen display, then the process 600 can indicate at step 675 that the screen display failed the color accessibility test.

At step 675, if the testing engine 508 detects that the screen display contained color coded information with no text at all or no meaningful text adjacent to or within the colored coded areas, then the testing engine 508 can indicate that the screen display failed the color accessibility test. In some embodiments, if the colorblind accessibility test fails, the testing engine 508 can automatically add text to the color coded information to make the information accessible to colorblind individuals. In another embodiment, an editing module can be included in computing system 500 to allow a user to manually input text within or adjacent to the color coded information. In some embodiments, if the colorblind accessibility test fails, the testing engine can send an alert of the failure (e.g., via email, short messaging service (SMS) and/or push notification) according to predefined alert preferences.

If meaningful text is detected adjacent to and/or within the color coded areas of the graphic, then the testing engine 508 can determine at step 675 that the screen display passed the colorblind accessibility test. The testing engine 508 can transmit the results of the test directly to the user, or can transmit the results of the test indirectly, for example, via the screen display module 506 and/or the results module 510. The results of the test can appear on the screen display itself, or in some other format, for example in a Microsoft Word® document or Excel® spreadsheet. In some embodiments, the testing engine can send the results of the test to a user (e.g., via email, short messaging service (SMS) and/or push notification) according to predefined user preferences.

Process 600, discussed above, can be modified to test the accessibility of other schemes that include color coded information, for example line charts, bar charts, column charts, area charts, scatter charts, stock charts, surface charts, doughnut charts, bubble charts, radar charts, map routes and data tables, and these images can be similarly analyzed for accessibility to colorblind individuals. In one embodiment, this can be accomplished by testing for, e.g., lines, bars, columns, squares, rectangles, bubbles doughnuts, areas, surfaces, stocks, spokes, webs, dots, spheres, map routes, stock indicators, adjacent shapes, rather than circles. Process 600, can also be modified to test for more than one scheme in a single screen display.

Another type of color coded information that can be found in user interfaces and other screen displays includes objects having the same shape but displaying different colors in a single screen display (e.g., traffic lights, bubbles, squares) To determine the accessibility of this type of color coded information, process 600 can be modified to check for multiple objects having the same shape but different colors, rather than a single circle (as in the pie chart embodiment discussed above).

The rules for testing the accessibility of the different types of schemes for conveying color coded information discussed above (e.g., pie chart, line chart, bar chart, objects of equal shape, column chart, area chart, scatter chart, stock chart, surface chart, doughnut chart, bubble chart, radar chart) can be hardcoded. Alternatively, these rules can also be dynamic by adding a configuration component that interprets a programming language or other computer language to control the test procedure. An exemplary configuration component containing rules for testing the accessibility of a pie chart, expressed in pseudo programming language, is included below.

```
Boolean piechartTest (image) {
image fullfiltered=filter(image, full);
                    /* apply full filter to image */
image processed=removelines (fullfiltered, threshold=4pt);
                    /* remove all lines thinner than 4pt */
list locations=detect-objects (processed, circle);
                    /* find all circle objects */
list texts = ocr(processed) /* find all texts in image */
foreach 1 in locations {/* for each circle detected */
    boolean piechart=true;
    image area=crop (image, 1);
                    /* analyze only the area of the current circle */
    foreach c in colors {
                    /* colors denotes the list of colors or color ranges
                       to be checked, see description */
    image filteredarea=filter(area, c); /* apply subset filter */
    list object=detect-objects (filteredarea);
                        /* find objects - typically just one will be
                           found for a pie chart */
    if object and not detect-objects(filteredarea,circle) then {
                        /* circle and object overlap */
        foreach o in object {
            list borderlines=borderlines(o); /* get the borderlines */
            int count=0;
            foreach b in borderlines if ends(b,center(1) then count++;
            if count < > 2 then piechart=false;
                            /* two borderlines must end in the middle
                               of the circle */
            if not(piechart) then next(location);
                            /* object is not a piechart, continue
                               with next circle */
            list insidetexts=ocr(o);
                            /* test for text inside the pie chart segment */
            boolean textfound=false;
            foreach t in insidetexts
                    if match(t.string,"*[a-zA-Z]*") then textfound=true;
            if not(textfound) then
                foreach t in texts
                        if adjacent (o,t)
                          and match(t.string,"*[a-zA-Z]*") then
                              textfound=true;
            if not (textfound) then return (false);
                            /* piechart segment without additional textual
                               information found, test must fail*/
        }
    }
    }
}
return true; /* all detected pie charts passed the test */}
```

The process 600 described in FIG. 6 can be applied manually to a single screen display or can be combined with an automated screen display testing algorithm to test each one of a sequence of screen displays automatically. Examples of existing automated screen display testing programs include EXSYST, which was developed as part of the Software-Cluster project EMERGENT or GUITAR, originally developed by Atif Memon at the Event-Driven Software Lab, although other screen display testing programs may be used. Each screen display that is tested can be annotated with the result of the colorblind accessibility test and saved. Further, a list of screen displays failing the colorblind accessibility test, discussed above in connection with FIG. 6, can be generated, for example in a Microsoft Word® document or Excel® spreadsheet. Additionally, a human can test the screen displays appearing on the list for false positive results. In a further embodiment, the results of the colorblind accessibility test for the sequence of screen displays tested via an automated screen display testing program may be recorded using standard screen capture software.

Figure 12:
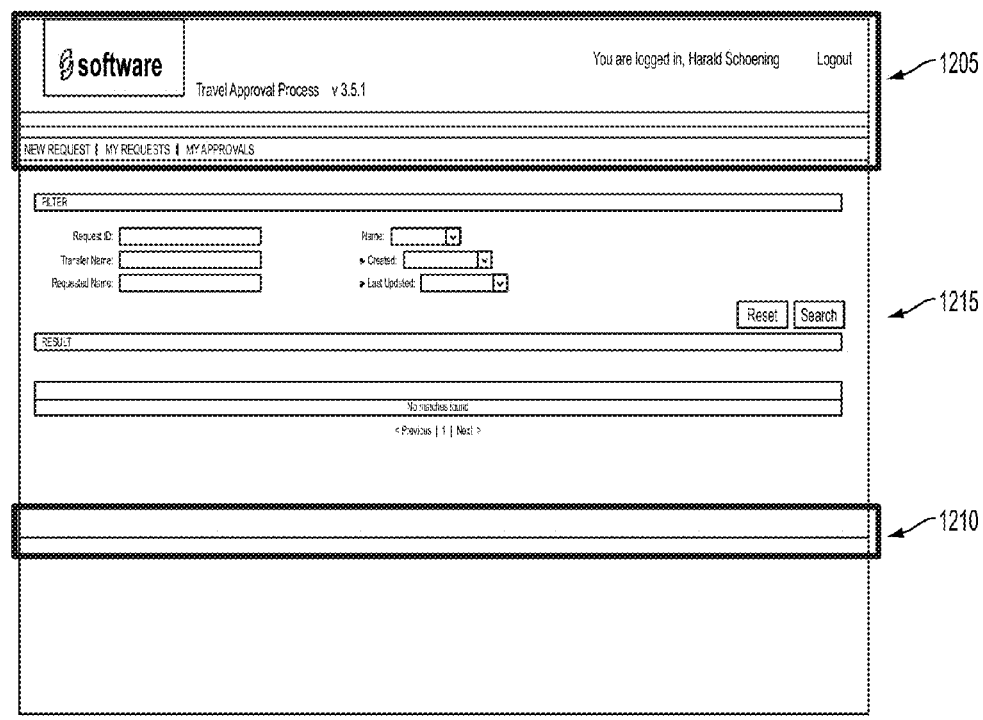
FIG. 12 is an exemplary structure of a screen display.

Referring to FIG. 12, exemplary screen structures analyzed herein can include simple graphical elements and text, which form various screen display areas, e.g., a header 1205, a footer 1210, and a body 1215. Process 600 for testing a screen display for colorblind accessibility can be applied to the entire screen display or to portions thereof. For example, the process 600 can be applied to one or more portions of the screen display at a time, testing each portion(s) separately. The areas to be tested can be defined manually before the test is executed and/or can be extracted from a sequence of screen displays, for example, obtained by an automated screen display testing tool.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors (sometimes referred to herein as a server) suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer (e.g., a mobile communication device) having a display device (e.g., a liquid crystal display), for displaying information to the user and a keypad by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The description herein describes network elements, computers, and/or components of a system used to implement embodiments of the disclosed subject matter that can include one or more modules. As used herein, the term "module" is understood to refer to computing software, firmware, hardware, and/or various combinations thereof. Modules, however, are not to be interpreted as software that is not implemented on hardware, firmware, or recorded on a non-transitory processor readable recordable storage medium (i.e., modules are not software per se). It is noted that the modules are exemplary and include at least some physical, tangible hardware. The modules can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

Other embodiments are within the scope and spirit of the disclosed subject matter.

What is claimed is:

1. A non-transitory computer readable medium comprising instructions that, when executed by a computer, cause the computer to:
   receive data corresponding to a screen display including information encoded in color;
   apply a color filter to the screen display to remove a background color generating a filtered image;
   detect an object in the filtered image;
   detect whether there is text in the filtered image;
   determine a proximity of the detected text to the object when text is detected by determining whether the text is located at least partially within the detected object, and when the text is not located at least partially within the detected object, determining whether the text is located within a predetermined distance of the detected object;

generate a positive colorblindness accessibility indicator when the detected text is located at least partially within the detected object or within the predetermined distance of the detected object; and generate a negative colorblindness accessibility indicator when the detected text is not located at least partially within the detected object or within the predetermined distance of the detected object.

2. The computer readable medium of claim 1, wherein the instructions are further configured to cause the computer to:
identify a predetermined display scheme in the screen display; and
detect an object in the filtered image by detecting an object associated with the predetermined display scheme in the filtered image.

3. The computer readable medium of claim 2, wherein the predetermined display scheme is at least one of a pie chart, bar chart, line chart, column chart, area chart, scatter chart, doughnut chart, stock chart, bubble chart, radar chart, surface chart, map route chart, data table, and a plurality of objects having same shapes but different colors.

4. The computer readable medium of claim 1, wherein the instructions are further configured to cause the computer to apply the color filter to the screen display such that the filtered image is a two-tone image.

5. The computer readable medium of claim 1, wherein the instructions are further configured to cause the computer to detect the object only in a selected portion of the screen display.

6. The computer readable medium of claim 1, wherein the instructions are further configured to cause the computer to
apply a second colored filter to the screen display to generate a second filtered image; and
detect at least one of an additional object and additional text in the second filtered image;
wherein the colorblindness accessibility indicator is further generated based on a position of the at least one additional object and additional text in the second filtered image.

7. A computer implemented method comprising:
receiving, at a processor, data corresponding to a screen display including information encoded in color;
applying, using the processor, a color filter to the screen display to remove a background color generating a filtered image;
detecting an object associated with the filtered image using the processor;
detecting whether there is text in the filtered image using the processor;
determining a proximity of the detected text to the object when text is detected using the processor by determining whether the text is located at least partially within the detected object, and when the text is not located at least partially within the detected object, determining whether the text is located within a predetermined distance of the detected object;
generating a positive colorblindness accessibility indicator using the processor when the detected text is located at least partially within the detected object or within the predetermined distance of the detected object; and
generating a negative colorblindness accessibility indicator when the detected text is not located at least partially within the detected object or within the predetermined distance of the detected object.

8. The method of claim 7, further comprising:
identifying a predetermined display scheme in the screen display; and
detecting an object in the filtered image by detecting an object associated with the predetermined display scheme in the filtered image.

9. The method of claim 8, wherein the predetermined display scheme is at least one of a pie chart, bar chart, line chart, column chart, area chart, scatter chart, doughnut chart, stock chart, bubble chart, radar chart, surface chart, map route chart, data table, and a plurality of objects having same shapes but different colors.

10. The method of claim 7, further comprising applying the color filter to the screen display such that the filtered image is a two-tone image.

11. The method of claim 7, further comprising detecting the object only in a selected portion of the screen display.

12. The method of claim 7, further comprising:
applying a second colored filter to the screen display to generate a second filtered image; and
detecting at least one of an additional object and additional text in the second filtered image;
wherein the colorblindness accessibility indicator is further generated based on a position of the at least one additional object and additional text in the second filtered image.

13. An apparatus comprising:
a screen display module configured to receive data corresponding to a screen display including information encoded in color;
a filter module configured to apply a color filter to the screen display to remove a background color generating a filtered image;
a detection module configured to detect an object associated with the filtered image and to detect whether there is text in the filtered image;
a proximity module configured to determine a proximity of the detected text to the object when text is detected by determining whether the text is located at least partially within the detected object, and when the text is not located at least partially within the detected object, determining whether the text is located within a predetermined distance of the detected object; and
an output module configured to generate a positive colorblindness accessibility indicator when the detected text is located at least partially within the detected object or within the predetermined distance of the detected object and to generate a negative colorblindness accessibility indicator when the detected text is not located at least partially within the detected object or within the predetermined distance of the detected object.

14. The apparatus of claim 13, further comprising:
an identification module configured to identify a predetermined display scheme in the screen display; and
a detection module configured to detect an object in the filtered image by detecting an object associated with the predetermined display scheme in the filtered image.

15. The apparatus of claim 14, wherein the predetermined display scheme is at least one of a pie chart, bar chart, line chart, column chart, area chart, scatter chart, doughnut chart, stock chart, bubble chart, radar chart, surface chart, map route chart, data table, and a plurality of objects having same shapes but different colors.

16. The apparatus of claim 13, wherein the filter module is further configured to apply the color filter to the screen display such that the filtered image is a two-tone image.

17. The apparatus of claim 13, wherein the detection module is further configured to detect the object only in a selected portion of the screen display.

18. The apparatus of claim 13, wherein:
the filter module is further configured to apply a second colored filter to the screen display to generate a second filtered image;
the detection module is further configured to detect at least one of an additional object and additional text in the second filtered image; and
the output module is further configured to generate the colorblindness accessibility indicator based on a position of the at least one additional object and additional text in the second filtered image.

* * * * *